Feb. 7, 1967 A. C. HOWELL, JR 3,303,294
COLLECTOR FOR USE IN ELECTRIFIED TROLLEY BUS WAY SYSTEMS
Filed Nov. 2, 1964 2 Sheets-Sheet 2
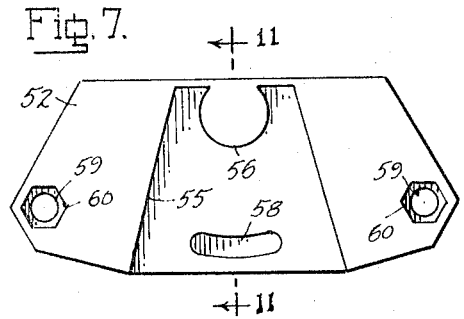
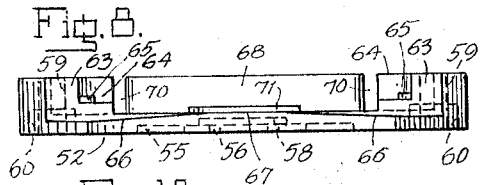
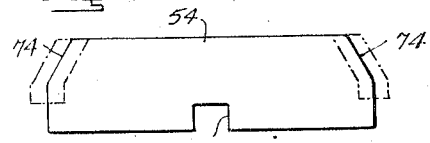
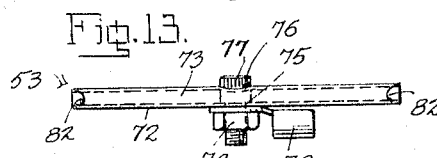
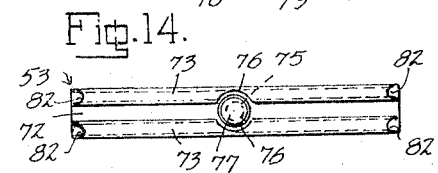
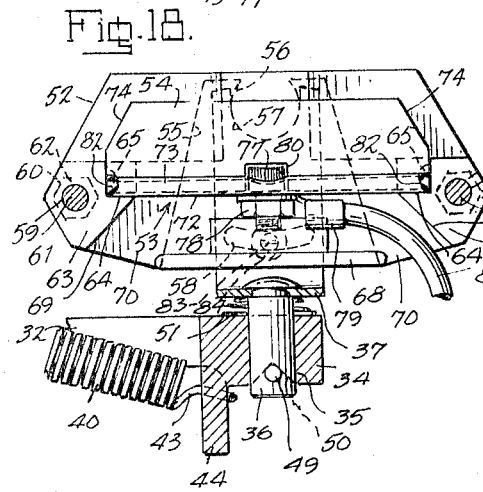
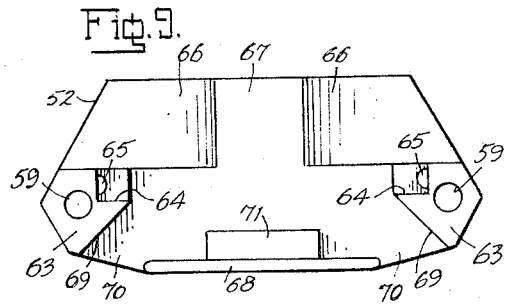
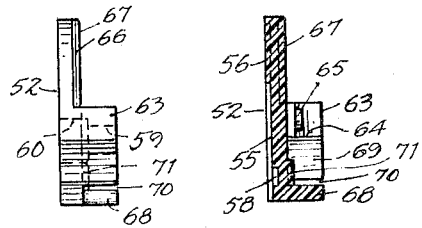
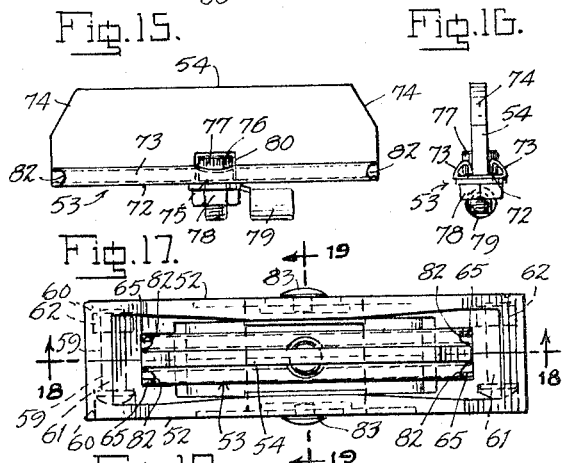
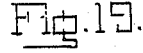
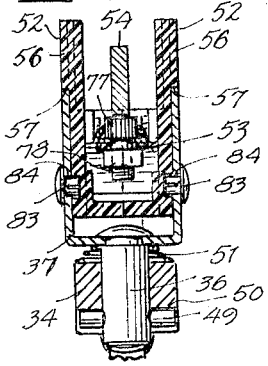
INVENTOR.
ALLEYNE C. HOWELL, JR.
BY
ATTORNEY.

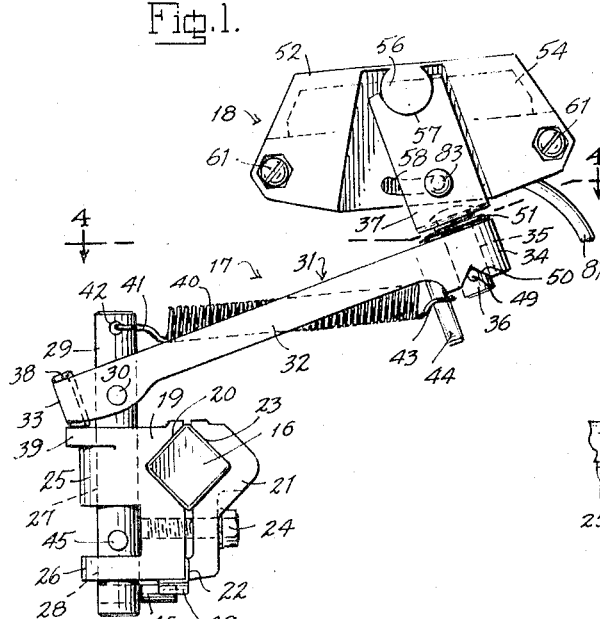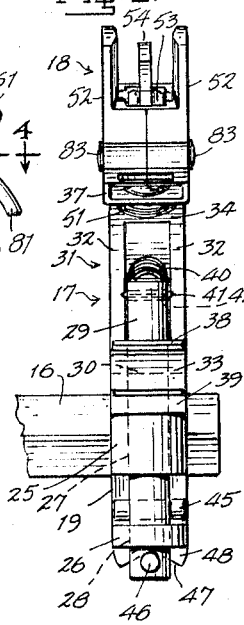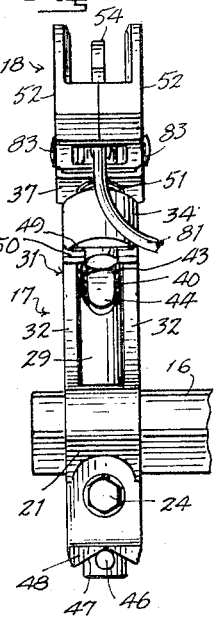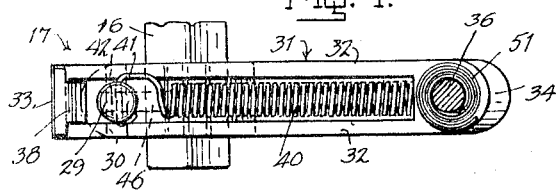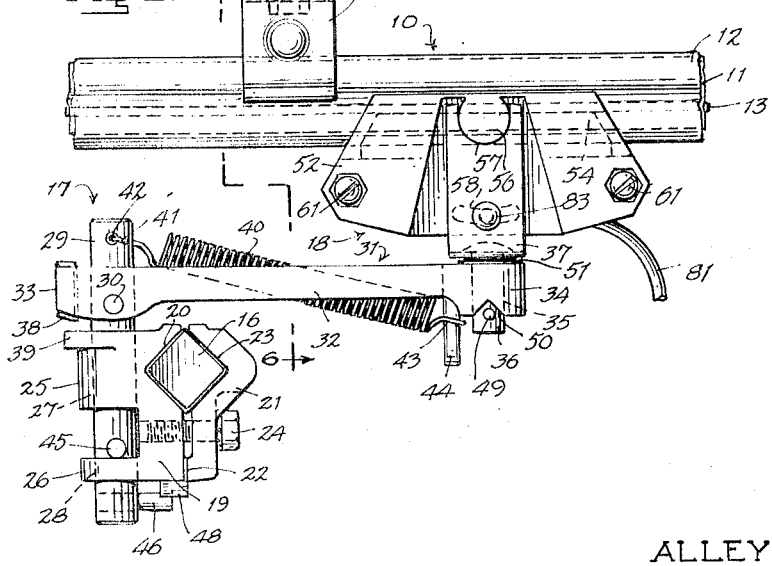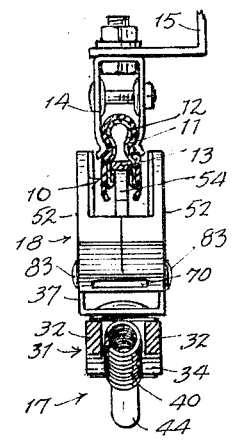

United States Patent Office 3,303,294
Patented Feb. 7, 1967

3,303,294
COLLECTOR FOR USE IN ELECTRIFIED
TROLLEY BUS WAY SYSTEMS
Alleyne C. Howell, Jr., 645 Mine Hill Road,
Fairfield, Conn. 06430
Filed Nov. 2, 1964, Ser. No. 408,203
10 Claims. (Cl. 191—64)

The present invention relates to an improved collector for use in electrified trolley bus way systems, particularly of the type wherein a spring-loaded shoe is adapted to have sliding engagement with a channeled conductor bar to transmit current from the conductor bar through the collector shoe to a motorized part supported for movement upon a track way paralleling the conductor bar.

It is an object of the invention to provide a collector having a collector shoe which may be readily inserted in or removed from the collector without the necessity of disassembling other parts of the collector, thus enabling the ready replacement of worn shoes or the substitution of shoes having different amperage ratings.

A further object is to provide a collector in which the shoe is adapted to have flat sliding contact with the conductor bar and which has pivotal movement about a central transverse axis in close proximity to or substantially intersecting the contacting surfaces of the collector shoe and the conductor bar to thus insure longer wear of the contacting parts, more effective electrical contact, and a smoother engagement of the collector shoe under conditions where the conductor bar may be diverted from a straight position, for example, when it may sag or bend between points of support.

A further object is to provide an improved spring loaded leverage for pivotally supporting the collector head, wherein a relatively long spring is employed to provide a soft spring action, and wherein the spring is so related in the linkage arrangement as to provide constant spring tension applied to the collector shoe in any position of movement of the leverage occasioned by raising or lowering movement of the collector shoe as a result of variations in the distance between the conductor bar and the point of support of the collector linkage, such as may result from wear of the contacting parts or other causes.

Another object is to provide a collector having improved means for permitting swivelling movement of the collector head and its supporting linkage while the collector shoe is engaged under tension with the conductor bar, and which automatically positions the collector head and linkage in a non-swivelling position when the collector head is out of engagement with the conductor bar. This feature insures proper tracking of the collector during its transition between spaced sections of a mechanically discontinuous conductor bar system, the retention of the collector head and linkage against swivelling orienting the head for engagement with pick-up guides and retracking the conductor bar.

Other objects and advantages will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

In the drawings:

FIG. 1 is a side elevation of a collector according to the invention shown in a disengaged position with respect to a conductor bar;

FIG. 2 is an end elevation as seen from the left in FIG. 1;

FIG. 3 is an end elevation as seen from the right in FIG. 1;

FIG. 4 is a top plan view partially in horizontal section taken along the line 4—4 of FIG. 1;

FIG. 5 is a side elevation showing the collector in engagement with a conductor bar;

FIG. 6 is a vertical transverse sectional view taken along the lines 6—6 of FIG. 5;

FIG. 7 is an elevational view of the outer side of one of the pair of identical members for forming the collector head casing;

FIG. 8 is a top plan view;

FIG. 9 is an elevational view of the inner side;

FIG. 10 is an end elevation as seen from the right in FIG. 7;

FIG. 11 is a vertical transverse sectional view taken along the line 11—11 of FIG. 7;

FIG. 12 is a side elevation of the collector shoe in separated relation;

FIG. 13 is a side elevation of the collector-shoe-receiving base in separated relation;

FIG. 14 is a plan view thereof;

FIG. 15 is a side elevation showing the collector shoe and base in assembled relation;

FIG. 16 is an end elevation thereof;

FIG. 17 is a plan view of the collector head with the collector shoe assembled therein;

FIG. 18 is a longitudinal vertical view taken along the line 18—18 of FIG. 17, the assembled collector shoe and base being shown in side elevation; and FIG. 19 is a transverse vertical sectional view taken along the line 19—19 of FIG. 17.

The collector according to the invention is adapted for use in connection with a conductor bar, indicated as 10 in FIGS. 5 and 6, of the type, for example, as disclosed in my patent for Conductor Bar, No. 3,144,508, granted August 11, 1964, and in my pending patent application for Conductor Bar, Serial No. 391,968, filed August 25, 1964. In general, this conductor bar comprises a sheet metal shell 11 of inverted U-shape in cross-section having a protective insulation sheath 12 engaged thereon and provided interiorly with a contact bar 13 for engagement by the shoe of the collector, the sides of the shell extending downwardly at each side of the contact bar to provide a guideway channel. The conductor bar is supported at intervals by hanger clamps 14 mounted upon brackets 15, and usually parallels a track, crane run-way, or the like, supporting a carriage carrying a motorized part, for example a crane or the like. Secured to the carriage is a horizontally extending square mounting bar 16 for the collector, upon which is clamped the spring-loaded trolley arm linkage indicated generally as 17 which pivotally supports the collector head 18, as will presently more fully appear.

The spring-loaded trolley arm linkage comprises a clamp body 19 having a V-shaped groove 20 at its inner side for embracing one side of the bar 16 and a clamping plate 21 having fulcrum engagement at its lower end 22 with the clamp body and provided at its upper end with a V-shaped groove 23 opposed to the groove 20 of the clamp body. The clamping plate is secured to the clamp body by a screw 24 which, upon being tightened, draws the clamping plate toward the clamp body to clamp the grooves 20 and 23 upon the bar 16.

Upon the outer side of the clamp body there are provided vertically spaced bearing projections 25 and 26 having aligned vertical cylindrical passages 27 and 28 in which a vertical cylindrical post 29 is engaged for rotatable and vertical sliding movement, with its upper and lower end portions projecting above and below the clamp body. Upon the upper exposed portion of the post there is pivotally mounted by means of a transverse pivot pin 30 a lever arm 31 comprising parallel side walls 32—32, a transverse wall 33 at one end, and a transverse bearing head 34 at the other end having a cylindrical passage 35 in which the cylindrical post 36 of the collector head supporting yoke 37 is engaged for rotatable and vertical sliding movement. The end wall 33 is embraced at its inner side and its upper and lower ends by a wear-piece 38 which, in the position of the collector out of contact with the conductor bar, as seen in FIG. 1, is engaged at its lower side with an upper planar shelf portion 39 of the clamp body.

A helical compression spring 40 has one hook end 41 engaged in a transverse hole 42 adjacent the upper end of the post 29 and its other hook end 43 engaged about a downwardly projecting finger 44 of the transverse bearing head 34, with the axis of the spring extending diagonally of the arm within the space defined by the side walls 32. It will be noted that the spring is a relatively long one approximating the length of the arm 31 resulting in a soft spring action, and that the points of connection of the two ends of the spring and the pivot axis of the arm 31 represented by the pivot pin 30 form the points of a triangle, of which the base is defined by a line extending between the axis of the pin 30 and the transverse hole 42 and the sides by lines extending from the pin 30 and the hole 42 to the hook connection 43 of the spring 40 with the finger 44. The arrangement is such that the spring exerts pressure to swing the lever arm in counter-clockwise direction, and the changing lengths of the sides of the triangle as the arm assumes different angular positions results in balancing the pressure exerted by the spring in any angular position of the arm. When the collector is in engagement with the conductor bar the balanced linkage results in a constant uniform pressure applied to the collector head to press it into contact with the conductor bar, thus making for reduced wear, easier sliding movement of the collector, and better electrical contact.

The post 29 is provided in the space between the bearing portions 25 and 26 of the clamp body 19 with a transverse pin 45 disposed parallel to the pivot axis of the pivot pin 30 and projecting at each side in opposed relation to the upper planar surface of the bearing portion 26, being upwardly spaced from this surface in the position of the collector out of contact with the conductor bar, as seen in FIG. 1, and being engaged therewith in the tensioned position of the collector in engagement with the conductor bar, as seen in FIG. 5. In this latter position the spring 40 exerts a downward force upon the post and an upward force upon the collector head, downward movement of the post being limited through engagement of the pin 45 with the planar surface of the bearing portion 26. Also in this position the post may have limited rotary movement through sliding engagement of the pin 45 with the planar surface of the bearing portion 26.

Upon the lower exposed end portion of the post 29 there is provided a pin 46 having its axis at right angles to the axis of the pin 45 and projecting from the post beneath the clamp body where it is disposed within the inverted V-shaped notch 47 of a downwardly projecting lug formation 48 upon the clamp body. In the position of the collector out of engagement with the conductor bar, as seen in FIG. 1, the lever arm 31 is moved in counter-clockwise direction under the pull of the spring 40 causing the wear-piece 38 to bear upon the planar surface of the shelf portion 39 of the clamp body to exert an upward force upon the post causing the pin 45 to move out of engagement with the planar surface of the bearing portion 26 and the pin 46 to be drawn under the pressure of the spring into centered relation in the V-shaped notch 47. This engagement serves to both limit the position of the post and the lever arm and to prevent swinging movement of the lever arm 31 about the axis of the post to thus position the collector in properly oriented re-engaging position when the collector is moved between discontinuous sections of the conductor bar and into engagement with a pick-up guide.

The collector head is also permitted to have rotary movement about the axis of the post 36 while the collector is in engagement with the conductor bar as seen in FIG. 5, and to be retained in a straight aligned position when disengaged from the conductor bar as seen in FIG. 1. For this purpose the post 36 is provided adjacent its lower end with a transverse pin 49 projecting at each side and disposed within an inverted transversely disposed V-shaped notch 50 provided in the under side of the transverse head portion 34 of the lever arm 31, where, in the disengaged position of the collector head, it is adapted to be retained under the pressure of a spiral coil spring 51 disposed about the post between the yoke 37 and the upper side of the transverse head portion 34. In the engaged position of the collector with the conductor bar, as seen in FIG. 5, the spring 51, as a result of the differential in spring pressure between it and the spring 40, compresses and allows the pin 51 to move downwardly out of engagement with the notch 50 where limited rotary movement of the collector head about the axis of the post 36 is permitted.

The collector head shown in detail in FIGS. 7–19 comprises a casing formed of a pair of identical complementary half parts 52—52 which are adapted to be bolted together, as will herein after more fully appear, and between which is interlockingly supported the current-conducting collector shoe supporting base 53 in which is inserted the collector shoe 54.

The casing parts 52 are molded from suitable dielectric material, a suitable material for this purpose being a thermo-setting plastic compound produced by American Cyanimid Company under the trade name Glaskyd, which is a mineral-filled, glass-fibre-reinforced alkyd molding compound. Each half part is of generally trapezoidal outline and is provided upon its outer face as seen in FIG. 7 with a downwardly divergent recess 55 provided at its upper end with a centrally disposed circular trunnion formation 56 adapted to be pivotally received in the upwardly opening substantially semi-circular recess 57 provided in the upper end of each side of the yoke 37, the divergent edges of the recess in relation to the parallel side edges of the yoke permitting limited swinging movement of the collector head within the yoke. An arcuate groove 58 is provided in the lower part of the recess 55 in concentric relation to the axis of the trunnion formation 56 for engagement by a retaining means inserted in the yoke to retain the collector head against upward movement within the yoke, as will hereinafter more fully appear. Adjacent the ends of each half part there are provided bolt holes 59 opening to hexagonal countersink pockets 60 at the outer side of the part for the purpose of receiving a pair of bolts 61 to secure the two half parts together with the heads of the bolts disposed in the countersink of one part and the nuts 62 disposed in the countersink of the other part.

The formation upon the inner side of each half part, as seen in FIG. 9, comprises a pair of pillar formations 63—63 adjacent the respective ends having planar faces to which the inner ends of the bolt holes open, and which planar faces of the pair of half parts comprising the assembled casing meet in its longitudinal central vertical plane. In the inner and upper corner of each pillar formation 63 there is provided a recess 64 of rectangular form to provide a seat for one end of the collector shoe base 53, and upon the vertical walls of each recess there is provided a semi-circular boss 65 upwardly spaced from the horizontal seating surface of the recess and which is adapted, as will hereinafter more fully appear, to provide an interlock to secure the collector shoe base 53 within the casing.

The inner surface of the side wall above the pillar formations converges as at 66 with respect to the outer surface of the side wall from each side of a central planar portion 67 to the respective side edges for the purpose of providing in the assembled relation of the two half parts divergent entrances to the collector head at each side of the collector shoe to permit limited swinging movement of the collector head with respect to the conductor bar.

Along the lower edge there is provided a bottom wall portion 68 having its ends spaced from the inclined inner surfaces 69 of the pillar formations 63, so that in the assembled relation of the two half parts with the base wall portions 68 meeting in the central longitudinal vertical plane of the collector head openings 70 are provided adjacent each end of the collector head for passage into the head of a conductor wire, as will presently more fully appear. An enlargement 71 at the inner side of the side wall disposed at the upper side of the bottom wall portion 68 provides additional thickness and reinforcement in the side wall to accommodate the groove 58.

The current-conducting base 53 for the collector shoe is in the form of a straight channel strip preferably of copper having a horizontal base wall 72 and side walls 73—73 in the form of curled bead-like formations bent from longitudinal marginal portions along the edges of the base wall in an upward, inward, and downward direction, to provide a longitudinally extending channel along the strip having slightly springy side walls to receive and frictionally retain the collector shoe 54.

The collector shoe is in the form of a bar of suitable current-conducting material, for example sintered copper and graphite in the proportions of approximately 90% copper and 10% graphite, its thickness being substantially equal to the width of the channel of the base to be received therein with a relatively tight frictional fit. Its length substantially corresponds to the length of the base. The end edges of the upper portion of the shoe are inclined upwardly and inwardly as at 74, and the upper portion may if desired be of increased or decreased length with respect to the lower portion which fits in the base for the purpose of increasing or decreasing the rated amperage. The broken lines in FIG. 12 indicate lenghtened and shortened upper shoe portions.

The horizontal base wall 72 of the base 53 is provided centrally with a bolt-receiving hole 75 and the side walls 73 are provided with arcuate cut-outs 76 to receive a headed bolt 77 provided at the under side of the base with a nut 78, and by means of which a conductor cable connecting clip 79 is secured at the under side of the base. A notch 80 is provided centrally of the lower edge of the collector shoe to clear the head of the bolt when the shoe is assembled with the base as seen in FIGS. 15 and 16. A cable 81 is adapted to be connected to the clip 79 as seen in FIG. 18 and may be extended therefrom through either of the cable openings 70 of the casing. The outer and top portions of the curled side walls 73 of the base are notched at each end as at 82 for the purpose of interlocking engagement therewith of the boss formations 65 provided in the seating recesses 64 of the casing, as will presently more fully appear.

The collector shoe base 53, either with or without the collector shoe inserted therein, is assembled in the casing by first fitting its ends within the seating recesses 64 of one half part of the casing, as seen in FIG. 18, with the notch ends 82 of one side wall of the base engaged beneath the boss formations 65, then assembling the other half part of the casing in similar manner to interlock its boss formations 65 with the notches 82 of the other side wall of the base, and thereupon securing the two half parts of the casing together by means of the bolts 61 and nuts 62. The collector shoe may be readily inserted or removed with respect to the assembled base, and in the assembled position it will be noted that its upper surface which is adapted to engage the contact bar of the conductor bar is substantially in line with the axis of the trunnion formation 56 to thus insure smooth engagement with the conductor bar. As shown in FIG. 18 the upper surface of the collector shoe is slightly above the axis of the trunnion formation, it being pointed out that this would be the condition in the case of a new collector shoe and that following normal wear its mean position before becoming worn sufficiently to require replacement would be in line with the axis.

The collector head is assembled with the yoke 37 by dropping it into place between the side walls of the yoke so that the trunnion formations engage the recesses 57, whereupon the head is retained against upward displacement by means of springy split shank headed studs 83 snapped through holes 84 in the side walls of the yoke into engagement with the arcuate grooves 58 of the casing, these grooves being of such length that they limit the swinging movement of the collector head with respect to the yoke to positions short of the engagement of the side edges of the yoke with the side walls of the recesses 55 of the casing, as clearly illustrated in FIG. 1.

What is claimed is:

1. In a collector for use in an electrified trolley bus way system including a conductor bar and a track supported movable part having a collector mounting bar, spring-loaded linkage for mounting on said bar, a yoke carried by said linkage, and a collector head pivotally supported by said yoke for sliding engagement with said conductor bar, said head comprising a pair of complementary casing half parts, bolt means securing said half parts together to form a casing, each of said half parts having means defining a collector shoe receiving space between them, longitudinally spaced seat means formed upon the inner sides of said half parts, a current-conducting base member engaged at its end portions upon said seat means and spanning the space therebetween, longitudinal channel means at the upper side of said base member, a cable connector secured to the lower side of said base member, passage forming means in said half parts providing a passage for a current-conducting cable into said casing to said connector, and a collector shoe inserted into said channel of said base member having an upper contact edge for engagement with said conductor bar.

2. The invention as defined in claim 1, wherein said base member comprises a horizontal base wall and a pair of side walls bent upwardly, inwardly and downwardly with respect to the side edges of said base wall with the downwardly bent portion thereof forming the side wall of a channel to receive said collector shoe with a frictional fit.

3. The invention as defined in claim 1, wherein said seat means has projection means adapted to overlie the ends of said base member to retain said base member against relative vertical movement in said casing.

4. The invention as defined in claim 1, wherein said base member comprises a horizontal base wall and a pair of side walls bent upwardly, inwardly and downwardly with respect to the side edges of said base wall with the downwardly bent portion thereof forming the side wall of a channel to receive said collector shoe with a frictional fit, and wherein said side walls have notched ends and said seat means has projection means for interlocking engagement in said notched ends to retain said base member against relative vertical movement in said casing.

5. The invention as defined in claim 1, wherein said casing includes trunnion means at its opposed sides for pivotal engagement with the sides of said yoke member, and wherein the pivotal axis of said trunnion means coincides with a transverse line substantially contiguous to the upper contact edge of said collector shoe.

6. In a collector for use in an electrified trolley bus way system including a conductor bar and a track supported movable part having a collector mounting bar, spring-loaded linkage for mounting on said bar, a yoke carried by said linkage, and a collector head pivotally supported by said yoke for sliding engagement with said conductor bar, and said linkage comprising a clamp body, clamp means cooperating with said body for clamping upon said mounting bar, upper and lower vertically spaced bearing means carried by said clamp body having axially aligned vertical cylindrical passages, a cylindrical post engaging in said passages for vertical sliding and rotary movement and including upper and lower end portions extending above and below said respective upper and lower bearing means, an elongated lever arm pivotally supported adjacent its inner end upon said post above said upper bearing means for swinging movement about a transverse axis, the outer end of said lever arm having said yoke mounted thereon, a helical compression spring connected at its inner end to said post in upwardly spaced relation to said transverse swinging axis of said lever arm, and connected at its other end to the outer end of said lever arm to impart upward movement thereto to press said collector head against said conductor bar, a first stop means carried by said post in the space between said upper and lower bearing means for engagement with the upper side of said lower bearing means through downward movement of said post, a second stop means carried by said post for engagement with the lower side of said clamp body through upward movement of said post, the inner end of said lever arm at the opposite side of its axis from said yoke adapted in a position of said collector head out of engagement with said conductor bar to bear upon the upper side of said clamp body to move said post upwardly to engage said second stop means and disengage said first stop means, and said spring adapted in an engaged position of said collector head with said conductor bar to move said post downwardly to engage said first stop means and disengage said second stop means.

7. The invention as defined in claim 6, wherein said lever arm is provided at its outer end with a cylindrical passage and said yoke is provided with a cylindrical post having vertical sliding and rotary movement in said passage, wherein an expansion spring is disposed between said yoke and said outer end of said lever arm, and stop means is carried by said post to limit the upward movement of said post under the pressure of said spring.

8. The invention as defined in claim 6, wherein said clamp body is provided at its under side with a V notch and wherein said second stop means is engageable with said V notch to retain said post against rotary movement.

9. The invention as defined in claim 7, wherein said outer end of said lever arm is provided at its under side with a V notch, and wherein said stop means of said post is engageable with said notch to retain said post against rotary movement.

10. The invention as defined in claim 6, wherein said clamp body is provided at its under side with a V notch and said second stop means is engageable with said V notch to retain said post against rotary movement, wherein said lever arm is provided at its outer end with a cylindrical passage and said yoke is provided with a cylindrical post having vertical sliding and rotary movement within said passage, wherein an expansion spring is disposed between said yoke and said outer end of said lever arm and stop means is carried by said post of said yoke to limit the upward movement of said post under the pressure of said spring, and wherein said outer end of said lever arm is provided at its under side with a V notch and said stop means of said post of said yoke is engageable with said last-mentioned V notch to retain said post of said yoke against rotary movement.

References Cited by the Examiner

UNITED STATES PATENTS

| | | | |
|---|---|---|---|
| 757,786 | 4/1904 | Smith | 191—60.1 |
| 1,765,441 | 6/1930 | Packer | 191—59.1 |
| 2,709,724 | 5/1955 | Mageoch | 191—59.1 |
| 2,896,032 | 7/1959 | Christman | 191—59.1 |
| 3,124,226 | 3/1964 | Sprigings | 191—59.1 |
| 3,142,368 | 7/1964 | Roney | 191—59.1 |

ARTHUR L. LA POINT, *Primary Examiner.*

S. T. KRAWCZEWICZ, *Assistant Examiner.*